(12) United States Patent
Marinov

(10) Patent No.: US 12,240,435 B2
(45) Date of Patent: Mar. 4, 2025

(54) BRAKE CONTROL UNIT, BRAKE CONTROL SYSTEM, VEHICLE CONTROL SYSTEM, AND VEHICLE COMPRISING THE BRAKE CONTROL SYSTEM

(71) Applicant: Hitachi Astemo Netherlands B.V., Zaltbommel (NL)

(72) Inventor: Asen-Antonov Marinov, Eindhoven (NL)

(73) Assignee: Hitachi Astemo Netherlands B.V., Zaltbommel (NL)

( * ) Notice: Subject to any disclaimer, the term of this patent is extended or adjusted under 35 U.S.C. 154(b) by 365 days.

(21) Appl. No.: 17/929,506

(22) Filed: Sep. 2, 2022

(65) Prior Publication Data

US 2023/0073739 A1 Mar. 9, 2023

(30) Foreign Application Priority Data

Sep. 3, 2021 (EP) ..................... 21194877

(51) Int. Cl.
*B60T 8/88* (2006.01)
*B60T 8/92* (2006.01)
*B60T 13/74* (2006.01)

(52) U.S. Cl.
CPC ................ *B60T 8/885* (2013.01); *B60T 8/92* (2013.01); *B60T 13/746* (2013.01); *B60T 2260/00* (2013.01); *B60T 2270/402* (2013.01); *B60T 2270/406* (2013.01)

(58) Field of Classification Search
CPC .......... B60T 8/885; B60T 8/92; B60T 13/746; B60T 2260/00; B60T 2270/402; B60T 2270/406
See application file for complete search history.

(56) References Cited

U.S. PATENT DOCUMENTS

| 10,131,332 | B1 | 11/2018 | Mastrocola et al. |
| 2020/0391713 | A1* | 12/2020 | Jung ................. B60T 17/06 |
| 2022/0024433 | A1* | 1/2022 | Yuyama ............ F16D 65/183 |

FOREIGN PATENT DOCUMENTS

| CN | 106394538 A | 2/2017 |
| WO | 2020/204509 A1 | 10/2020 |

OTHER PUBLICATIONS

Hernandez-Gallegos "Extended European Search Report" issued in EP21194877.3; mailed Mar. 18, 2022; 14 pages.

* cited by examiner

*Primary Examiner* — Jacob M Amick
(74) *Attorney, Agent, or Firm* — Studebaker Brackett PLLC

(57) ABSTRACT

A brake control unit (50) is provided to drive a brake actuator. The brake control unit comprises a primary control branch (510) with a primary inverter (512) and a primary EMI-filter (517) and a secondary control branch (520) with a secondary inverter (522) and a secondary EMI-filter (527). The primary control branch is configured to provide drive signals ($D_{10}$) to the brake actuator in a normal operational mode. The secondary control branch (510) is configured to provide drive signals to the brake actuator in the at least a second operational mode. During the first, normal operational mode, both the primary EMI-filter and the secondary EMI-filter are coupled with their input to the power source. Therewith an improved reduction of conducted electromagnetic interference is achieved.

20 Claims, 11 Drawing Sheets

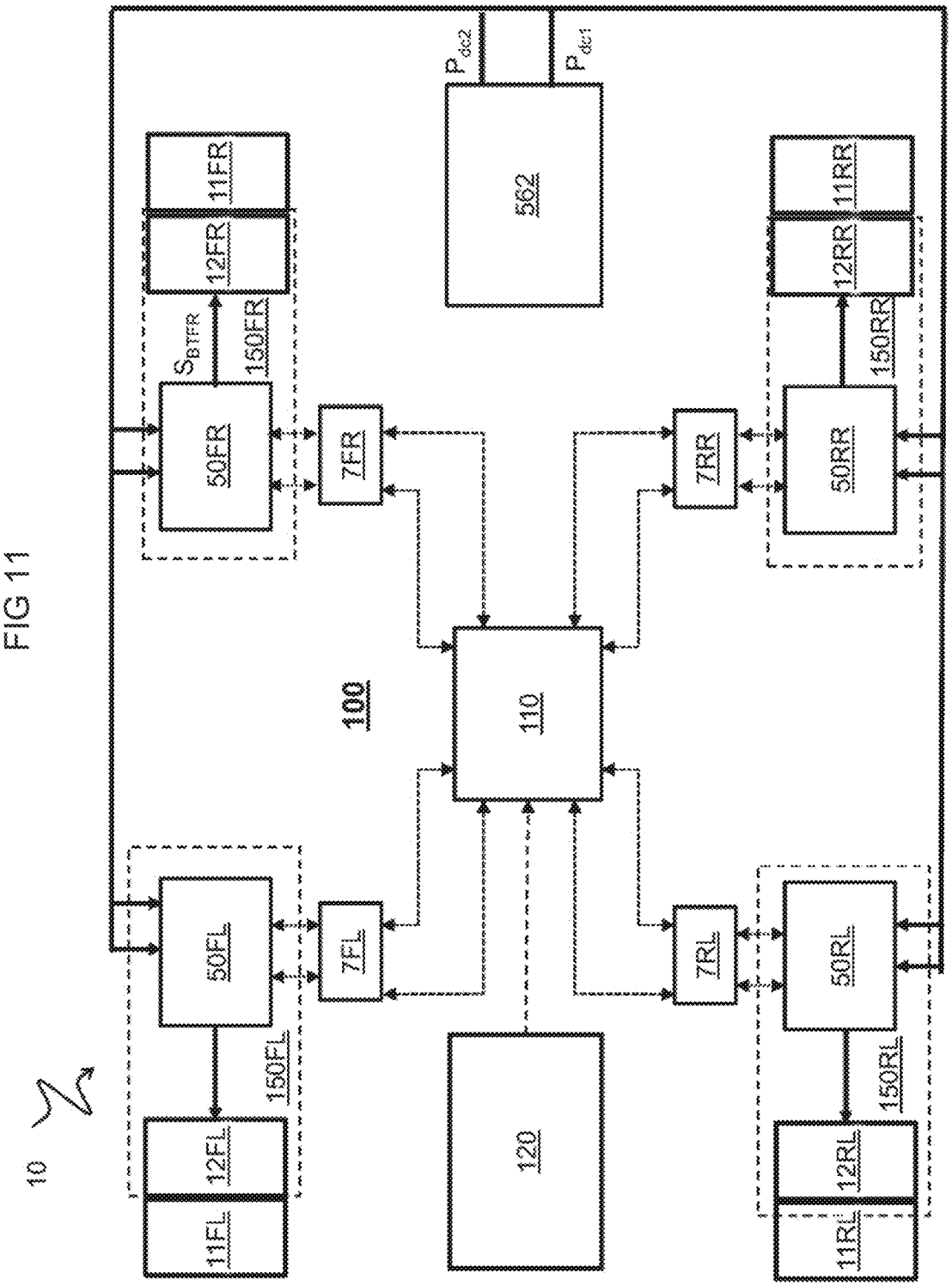

BRAKE CONTROL UNIT, BRAKE CONTROL SYSTEM, VEHICLE CONTROL SYSTEM, AND VEHICLE COMPRISING THE BRAKE CONTROL SYSTEM

BACKGROUND

A brake control unit is configured to drive a brake actuator in response to an external brake control signal. A fail operational brake control unit is designed with redundant circuitry to mitigate the risk of malfunctioning. Typically the redundant circuitry comprises a primary control branch and a secondary control branch that each are capable to generate drive signals for the actuator independent from the other. For that purpose each branch comprises an inverter which when coupled to a power supply is capable to generate the drive signals. Each branch further comprises a controller to control the operation of the invertor.

An inverter in combination with the actuator driven therewith forms a source of noise. When this noise is not sufficiently suppressed, other devices relying on the power supply may be affected. EMC (Electromagnetic Compliance) conducted emission requirements are specified for this purpose. In order to comply therewith, an EMI-filter is necessary via which the invertor is coupled to the power supply. The EMI-filter suppresses a backpropagation of noise originating from the invertor and actuator to the power supply. Hence, in a fail operational brake control unit each of the branches needs to be provided with an EMI-filter, regardless whether the branches are mutually identical (symmetrical architecture) or whether one of the branches is provided as a backup with reduced functionality.

There is a need to achieve a required level of noise suppression, with a modest requirements to the EMI-filters.

SUMMARY

In accordance with a first aspect of the present disclosure, an improved brake control unit is provided.

The improved brake control unit is configured to drive a brake actuator with a drive signal in response to an external brake control signal. The improved brake control unit comprises a primary control branch, a secondary control branch, the brake control unit and is configured to assume an operational mode selected from at least a first, normal operational mode and at least a second operational mode, dependent on a diagnostic state indication. In some embodiments the diagnostic state indication originates from an external diagnostic module, for example a main controller. In other embodiments the improved brake control unit has an auto-diagnostic module. In examples thereof the auto-diagnostic module is configured to provide the diagnostic state indication partly based on one or more external diagnostic state indications.

The primary control branch has a primary inverter that is configured to provide the drive signals to the brake actuator in the normal operational mode. The primary control branch further has a primary control module to controls operation of the primary inverter and a primary EMI-filter to mitigate noise originating from the primary inverter and the brake actuator. The primary EMI-filter has inputs for receiving electric power from a power source and outputs for providing electric power to the primary inverter.

The secondary control branch has a secondary inverter that is configured to provide the drive signals to the brake actuator in the at least a second operational mode. The secondary control branch further has a secondary control module to control operation of the secondary inverter and a secondary EMI-filter to mitigate noise originating from the second inverter and the brake actuator. The secondary EMI-filter has inputs for receiving electric power from the power source and outputs for providing electric power to the secondary inverter.

Exemplary primary and secondary EMI-filters have at least one inductive element and at least one capacitive element.

During the first, normal operational mode of the improved brake control unit the secondary EMI-filter is coupled with its inputs to the power source despite the fact that only the primary EMI-filter is required to enable the primary invertor to receive power from the power supply. It has been recognized by the inventor that the secondary EMI-filter therewith provides for a substantial reduction of noise to the power supply.

For a substantial reduction of noise during operation in the normal operational mode it is not essential that the secondary EMI-filter is configured in a manner that is identical to the primary EMI-filter. In an embodiment a total capacity of capacitive elements in the secondary EMI-filter is less than a total capacity of capacitive elements in the secondary EMI-filter. Therewith a substantial reduction of noise during operation in the normal operational mode is achieved with modest hardware costs.

In an embodiment, with the improved brake control unit operative in the first, normal operational mode the secondary invertor is enabled to generate secondary drive signals, but is prevented from providing the secondary drive signals to the brake actuator. In this embodiment, during the normal operational mode, all components of the secondary control branch are functional. The secondary inventor is however prevented from delivering its secondary drive signals to the brake actuator. In some examples thereof, the brake control unit comprises a diagnostic element that compares the secondary drive signals generated by the secondary invertor with primary drive signals generated by the primary invertor.

In an embodiment, with the improved brake control unit operative in the first, normal operational mode at least one output of the secondary EMI-filter is decoupled from the secondary invertor. Therewith, in the normal operational mode, the secondary invertor is deactivated. With both the primary EMI-filter and the secondary EMI-filter being coupled with their input to the power source and the secondary invertor is deactivated a still further reduction in noise level is achieved.

In an embodiment, the brake control unit is capable of operating in an operational mode, wherein at least an input of the secondary EMI-filter is decoupled from the power source. In case the diagnostic state indication indicates that the primary control branch is healthy, but that the secondary control branch is not, the input of the secondary EMI-filter is decoupled from the power source. Therewith also the secondary invertor is decoupled and deactivated, so that the brake control unit can at least temporarily continue to function despite the deficiencies identified in the secondary control branch.

According to a second aspect of the present disclosure, an electric brake system is provided that comprises an improved brake control unit as disclosed herein and a vehicle brake motor controlled by the brake control unit. In one example, the electric brake system is provided as a unit wherein the brake actuator and the brake control unit are accommodated in a common housing. In another example, the brake actuator and the brake control unit are provided as system elements that are functionally coupled.

According to a third aspect of the present disclosure, a vehicle control system is provided that comprises the electric brake system and that additionally comprises one or more further control units to control additional vehicle functions. In the vehicle control system, the brake control unit is configured to change an operational mode of at least one of the one or more additional control units in accordance with its own operational mode. In an example thereof, the one or more additional control units comprise a speed control unit for controlling a speed of the vehicle. The brake control unit when operating in an operational mode other than its normal operational mode therein is configured to impose a maximum on the speed with which the speed control unit is enabled to drive the vehicle. This enables a driver to bring the vehicle to a garage for repair, while mitigating risks. In an example the brake control unit causes the vehicle control system to discontinue vehicle operation upon determining that a predetermined time interval has lapsed and/or a predetermined distance was driven with the vehicle since its operational mode was no longer the normal operational mode. This urges the driver not to unnecessarily postpone a repair of the brake unit. According to a fourth aspect of the invention a vehicle is provided that comprises a plurality of wheels and a vehicle brake system as defined above or a vehicle control system that comprises a vehicle brake system as defined above, wherein at least one wheel of the plurality of wheels is provided with a vehicle brake motor of the vehicle brake system to controllably apply braking to said at least one wheel. In an embodiment each of the wheels is provided with a respective brake motor. In some examples each brake motor is controlled by a respective brake control unit. In other examples two or more brake motors are controlled by a common brake control unit.

BRIEF DESCRIPTION OF THE DRAWINGS

These and other aspects of the present disclosure are described in more detail with reference to the drawings. Therein:

FIG. 11 schematically shows a vehicle provided with an improved brake control system.

DETAILED DESCRIPTION OF EMBODIMENTS

Figure 1:
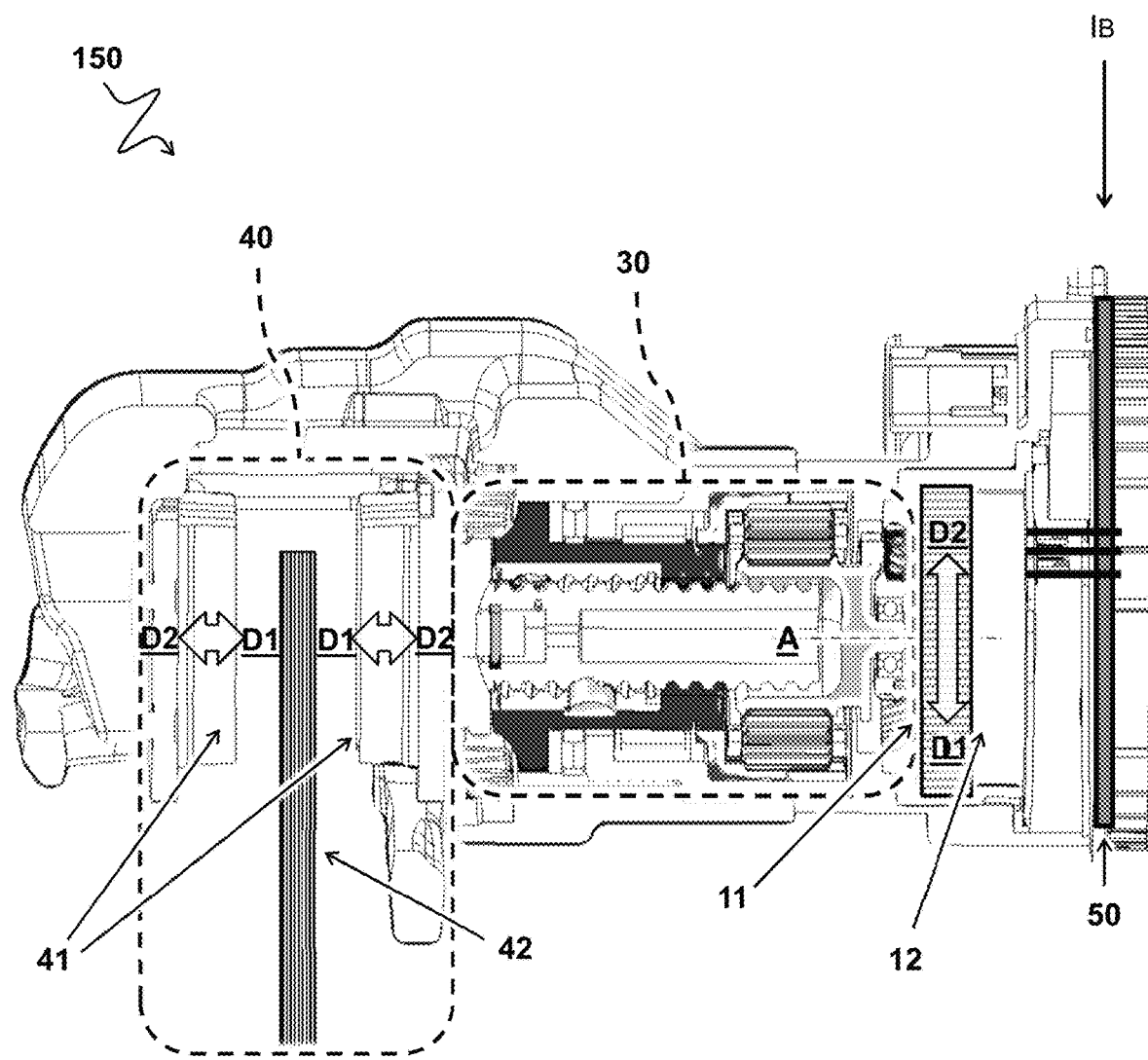
FIG. 1 illustrates an embodiment of an electric brake system.

Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise.

The invention is described more fully hereinafter with reference to the accompanying drawings, in which embodiments of the invention are shown. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

FIG. 1 illustrates an electric brake system 150. As described herein, the brake system 150 comprises or couples to an electric brake motor 12 which transmits mechanical energy to a brake mechanism 40 via a brake transmission 30. Typically, the electric brake motor 12 is configured to transduce electrical power into mechanical power. An electric motor is understood as a machine that converts electrical energy into mechanical energy. For example, the electric motor operates through interaction between the motor's magnetic field and electric current in a wire winding to generate force in the form of rotation of an output shaft.

In some embodiments, the system comprises or is coupled to a brake mechanism 40 configured to apply braking to a wheel of a vehicle, or release braking of the wheel, depending on a mechanical state of the brake mechanism 40. For example, the mechanical state of the brake mechanism 40 is configured to vary anywhere between a (maximum) braked state, and a (fully) released state in which no braking is applied, or intermediate states in which at least some braking is applied.

Typically, a brake transmission 30 is configured to transmit the mechanical power from the electric brake motor 12 to the brake mechanism 40. In a preferred embodiment, as described herein, the brake transmission 30 comprises a self-locking mechanism. For example, the locking mechanism is configured to maintain the mechanical state of the brake mechanism 40 in absence of the electrical power to the electric brake motor 12. In some embodiments, self-locking occurs when the brake transmission is in a static state—i.e. not moving. For example, the brake transmission comprises a worm gear. Without being bound by theory, as long as a coefficient of friction between the gear and the worm is larger than the tangent of the worm's lead angle, the worm gear can be considered self-locking and will not back drive. Of course also other self-locking mechanisms are suitable.

In one embodiment, the brake system comprises a piston-type mechanism, but also other mechanisms (e.g. a floating type caliper brake) are suitable. The brake illustrated in FIG. 1 is an example of a floating type caliper brake. Typically, the brake transmission comprises a set of gears which are operationally connected to an output axle of the brake motor 12. In some embodiments, gears in the brake transmission are configured to drive a spindle which is housed in a spindle nut to move a piston. In an embodiment, the piston in turn is guided, e.g. by guide pins to drive the opening and closing movements of a caliper 41 which can be considered part of the brake mechanism 40. For example, in an embodiment the caliper is fitted with two opposing brake pads. The mechanical energy which is transmitted via the brake transmission 30 to the brake mechanism 40 is thus ultimately used to drive the two braking pads closer to each other to perform or activate a braking operation, and apart from each other to release of deactivate a braking operation. In some embodiments, the caliper 41 is fixed to a bracket by which the caliper 41 is to be suspended over a brake disc 42 of a wheel such that the brake disc is provided between the pads of the caliper. For example, the brake disc 42, is connected to at least one wheel of the vehicle, e.g. on a wheel axle directly connected to the wheel and brake disc. In some embodiments, e.g. as shown, a primary gear 11 is operationally connected to rotate with the brake transmission 30. For example, while braking is applied to the wheel via the brake transmission the primary gear 11 is rotated in a brake applying direction "D1". For example, while braking of the wheel is released, the primary gear 11 is rotated in an opposite, brake releasing direction "D2".

Figure 2:
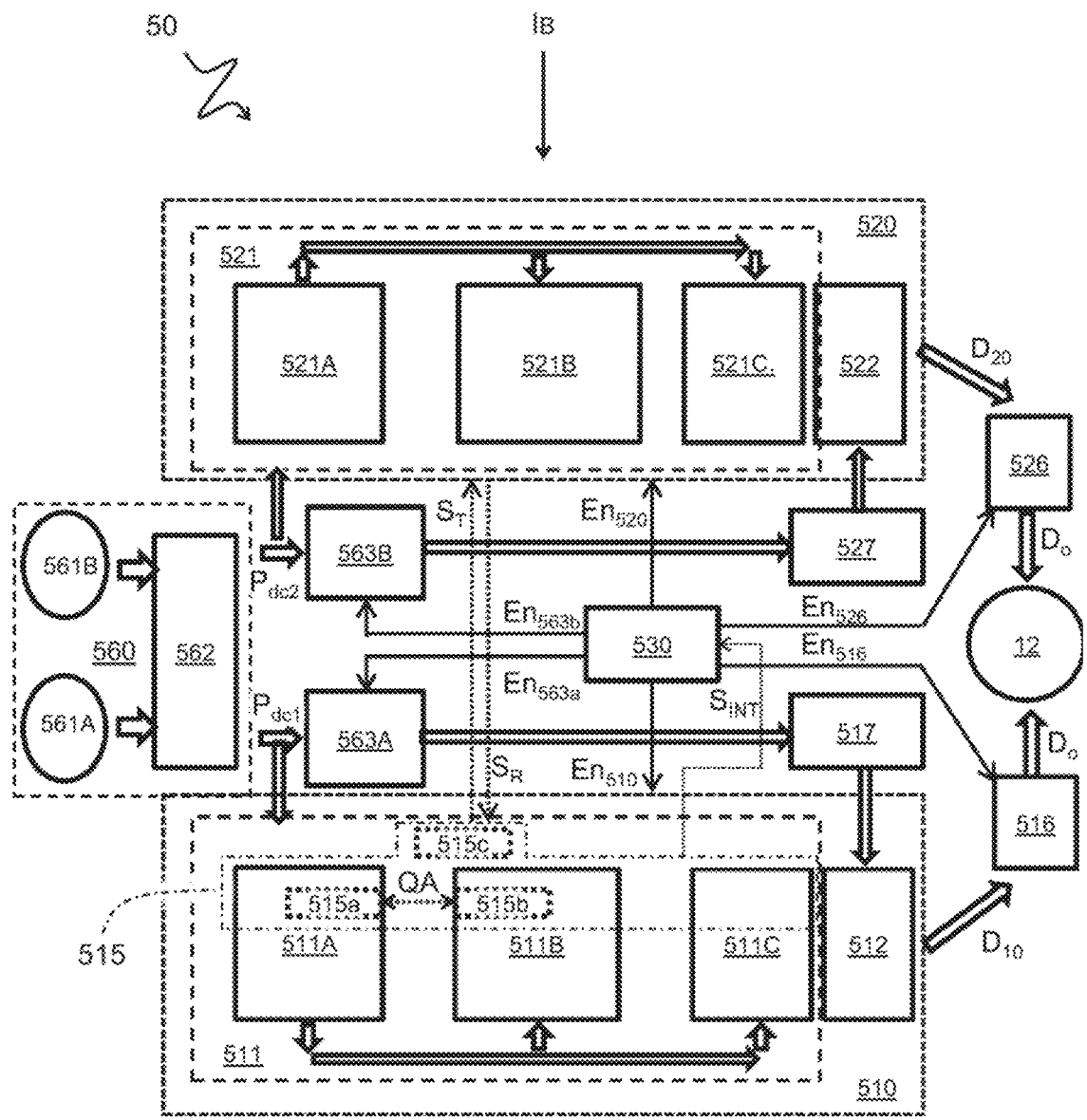
FIG. 2 illustrates an embodiment of an improved brake control unit.

FIG. 2 schematically shows a brake control unit 50 that comprises a primary control branch 510 and a secondary control branch 520.

The primary control branch 510 has a primary inverter 512 and a primary control module 511 to control operation of the primary inverter. The primary control branch 510 further has a primary EMI-filter 517 to mitigate noise originating from the primary inverter and the brake actuator. The primary EMI-filter 517 has inputs for receiving electric power from a power source and outputs for providing electric power to the primary inverter.

The secondary control branch 520 has a secondary inverter 522 and a secondary control module 521 to control operation of the secondary inverter. The secondary control branch 520 further has a secondary EMI-filter 527 to mitigate noise originating from the second inverter and the brake actuator. The secondary EMI-filter has inputs for receiving electric power from the power source and outputs for providing electric power to the secondary inverter.

Figure 3:
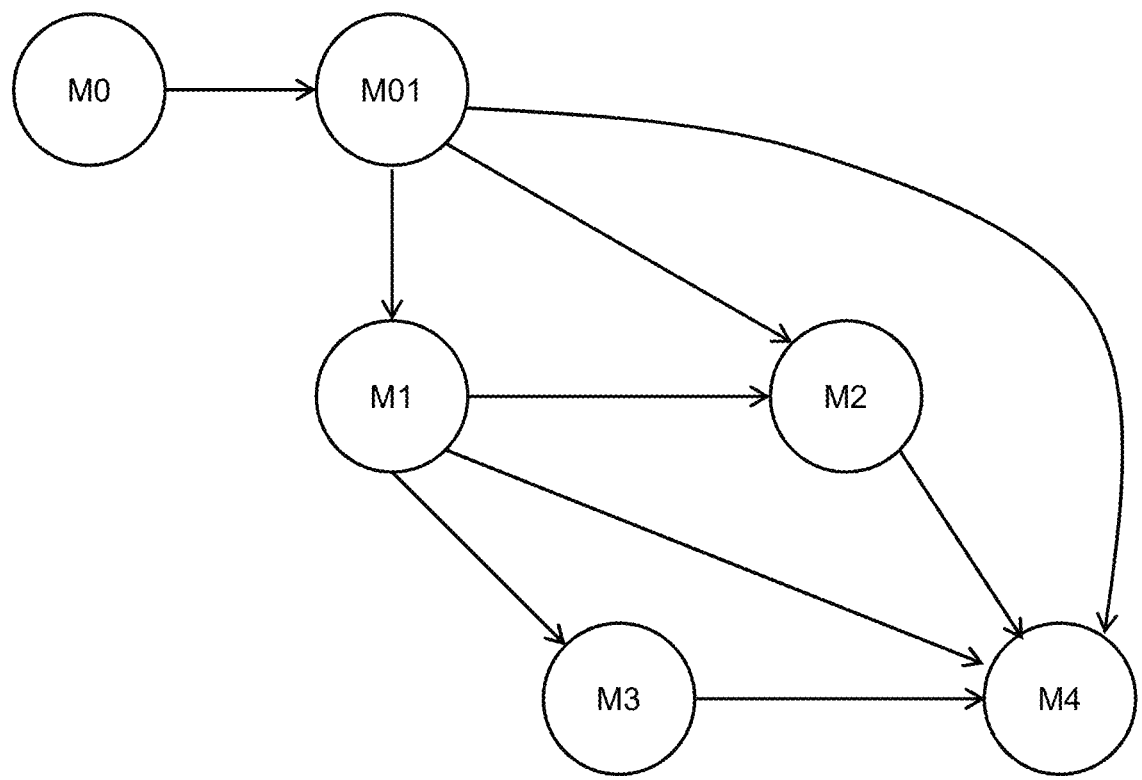
FIG. 3 illustrates an exemplary operational mode diagram.

As schematically shown in FIG. 3, the brake control unit 50 is configured to assume an operational mode selected from at least a first, normal operational mode M1 and at least a second operational mode M2, dependent on a diagnostic state indication $S_{INT}$. In the example of FIG. 3 further operational modes M0, M01, M3 and M4 are selectable. These further operational modes will be The primary inverter 512 is configured to provide the drive signals $D_{10}$ to the brake actuator 12 in the first, normal operational mode M1 and the secondary inverter 522 is configured to provide the drive signals to the brake actuator 12 in the second operational mode M2.

Figure 4:
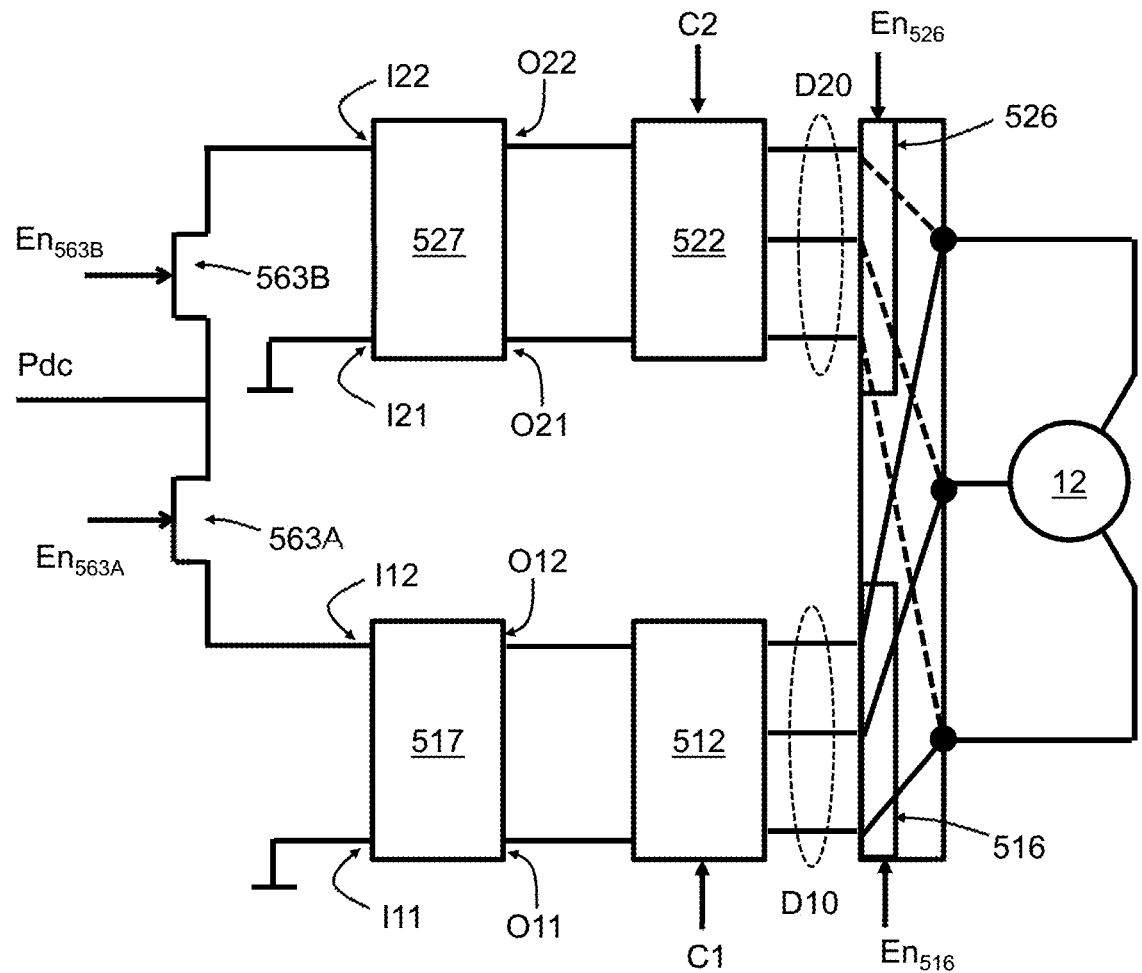
FIGS. 4, 5 and 6 respectively shows a portion of an embodiment of an improved brake control unit configured for operation in a normal operational mode, a second operational mode and a third operational mode.

FIG. 4 shows a portion of an embodiment of an improved brake control unit configured for operation in the normal operational mode M1. In the embodiment shown, the primary EMI-filter 517 has a first input I11 and a second input I12. The first input I11 is connected to a mass clamp and the second input I12 is connected via a first power supply switch 563A to a power supply line Pdc. The primary invertor 512 is connected to outputs O11, O12 of the primary EMI-filter 517. The primary invertor is configured to provide a 3-phase drive signal $D_{10}$ for the brake actuator 12. A primary phase cut-off switch 516 controllably connects outputs of the primary invertor 512 to inputs of the brake actuator 12.

Similarly, the secondary EMI-filter 527 has a first input I21 and a second input I22. The first input I21 is connected to a mass clamp and the second input I22 is connected via a second power supply switch 563B to the power supply line Pdc. The secondary invertor 522 is connected to outputs O21, O22 of the secondary EMI-filter 527. The secondary invertor is configured to provide a 3-phase drive signal $D_{20}$ for the brake actuator 12. A secondary phase cut-off switch 526 controllably connects outputs of the secondary invertor 526 to the inputs of the brake actuator 12.

An operational mode of the brake control unit is controlled by control signals $En_{516}$, $En_{526}$, $Enz_{563A}$ and $En_{563B}$. In an embodiment the brake control unit comprises a proper mode control utilities, e.g. 530 in FIG. 2. In other embodiments the control signals originate from an external source, e.g. a master controller.

In the situation shown in FIG. 4, the brake control unit operates in the normal operational mode. As shown in FIG. 4, in the normal operational mode the control signals $En_{563A}$ and $En_{536B}$ maintain the power supply switches 563A and 563B in an electrically conductive state. Furthermore, the phase cut-off switch 516 is controlled by control signal $En_{516}$ to connect the outputs of the primary invertor 512 to the actuator 12, and therewith enables the primary invertor 512 to provide the drive signal $D_{10}$ to the actuator 12. Phase cut-off switch 526 is controlled by control signal $D_{10}$ to disconnect the outputs of the secondary invertor 522 from the actuator 12, and therewith prevents that the secondary invertor 522 provides the drive signal $D_{20}$ to the actuator 12. Accordingly, whereas only the primary invertor 512 is enabled to provide its drive signal $D_{10}$ to the actuator 12, not only the primary EMI-filter 517, but also the secondary EMI-filter 527 are electrically coupled to the power source.

Figure 5:
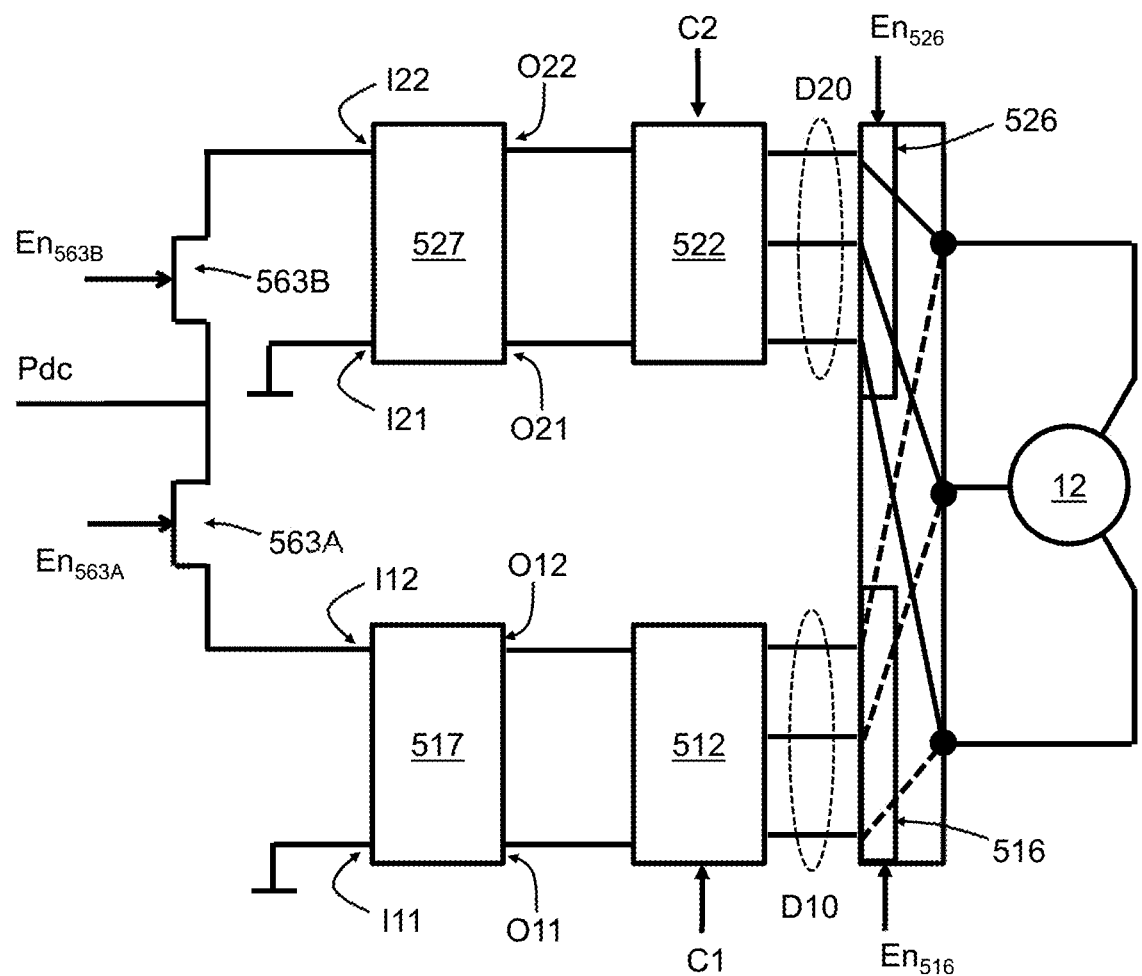

FIG. 5 illustrates the second operational mode M2, which is entered if the diagnostic state indication indicates that the primary branch is not reliable. Therein the primary invertor 512 is prevented from providing its drive signal $D_{10}$ to the actuator 12, and the secondary invertor 522 is enabled to provide the drive signal $D_{20}$ instead. To that end phase cut-off switch 516 is controlled by control signal $En_{516}$ to disconnect the outputs of the primary invertor 512 from the actuator 12, and phase cut-off switch 526 is controlled by control signal $En_{526}$ to connect the outputs of the secondary invertor 522 to the actuator 12.

Figure 6:
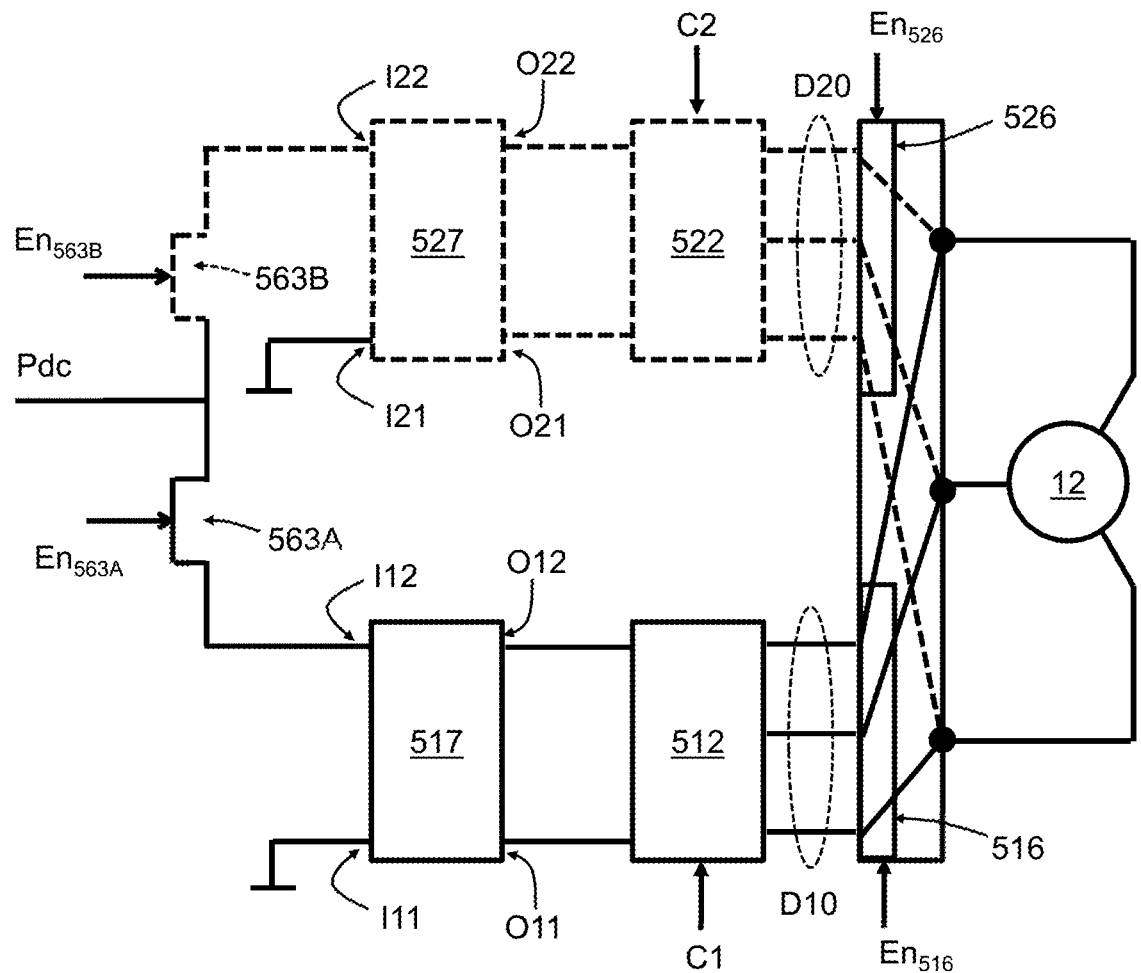

FIG. 6 shows a third operational mode, which is entered if the diagnostic state indication indicates that the secondary branch is not reliable. The third operational mode differs from the first operational mode, in that not only the secondary branch is prevented from providing a drive signal to the actuator, but that an input I22 of the secondary EMI-filter 527 is disconnected from the power supply line Pdc in that the control signal $En_{563B}$ opens the switch 563B.

Furthermore, the phase cut-off switch 516 is controlled by control signal $En_{516}$ to connect the outputs of the primary invertor 512 to the actuator 12, and therewith enables the primary invertor 512 to provide the drive signal $D_{10}$ to the actuator 12. Phase cut-off switch 526 is controlled by control signal $En_{526}$ to connect the outputs of the secondary invertor 522 to the actuator 12, and therewith prevents that the secondary invertor 522 provides the drive signal $D_{2o}$ to the actuator 12.

Figure 7:
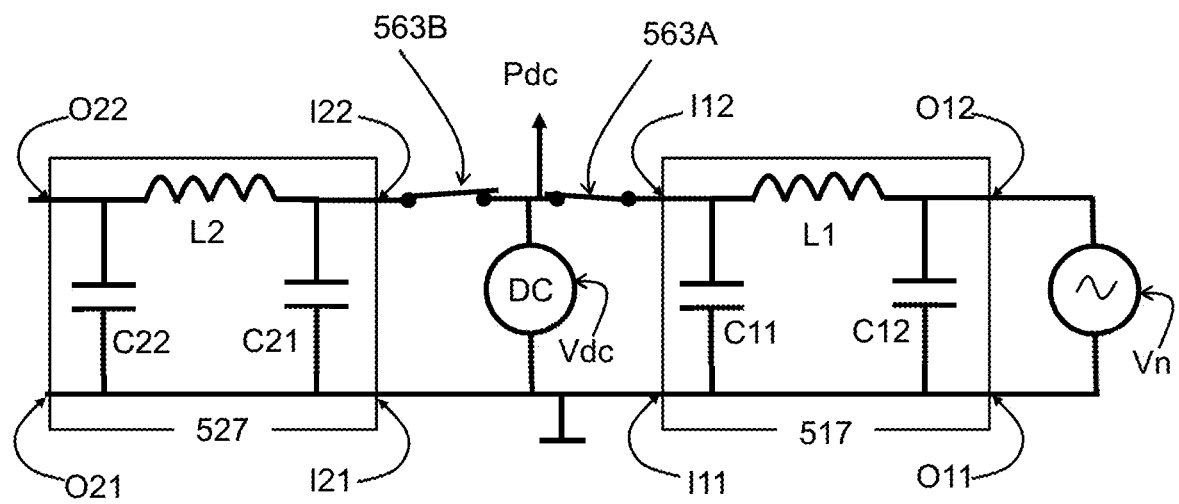
FIG. 7 shows exemplary elements of an embodiment of an improved brake control unit in more detail.

FIG. 7 shows exemplary elements of an embodiment of the improved brake control unit in more detail. In the situation shown in FIG. 7, the improved brake control unit operates in the normal operational mode. As schematically shown therein both controllable power supply switches 563A and 563B are closed, and therewith respectively connect the power supply line Pdc to the second inputs of the primary EMI-filter 517 and the secondary EMI-filter 527 respectively. The invertor 512 and the actuator 12 are schematically indicated as a noise source Vn. As shown in more detail in FIG. 7, the primary EMI-filter is a PI-filter or CLC filter, comprising a first capacitive branch with a first capacity C11 between its inputs I11, I12, a second capacitive branch with a second capacity C12 between its outputs O11, O12 and an inductive branch between the second input I12 and the second output O12 comprising a first inductor L1. Likewise the secondary EMI-filter is a PI-filter, comprising a first capacitive branch with a third capacity C21 between its inputs I21, I22, a second capacitive branch with a fourth capacity C22 between its outputs O21, O22 and an inductive branch between the second input I22 and the second output O22 comprising a second inductor L2.

In alternative embodiments the direct connection between the first input I11 and the first output O11 is replaced with a further inductive branch. In other alternative embodiments the EMI-filter comprises multiple stages, that each comprise at least one capacitive element bridging the inputs and at least one inductive element to decouple an input from an output.

In an exemplary embodiment the first capacity C11 is formed by 9 parallel capacitors having a total capacitive value of about 93 µF, the first inductor L1 has an inductance of about 1 µH, and the second capacitance C12 is formed by 5 parallel capacitors having a total capacitive value of about 1650 µF. Hence a total capacitive value of the primary EMI-filter 517 amounts to about 1743 µF.

Furthermore, the third capacity C21 is formed by a pair of parallel capacitors having a total capacitive value of about 55 µF, the second inductor L2 has an inductance of about 1 pH, and the fourth capacitance C22 is formed by 3 parallel capacitors having a total capacitive value of about 1000 µF. Hence a total capacitive value of the secondary EMI-filter 527 amounts to about 1055 µF.

Figure 8:
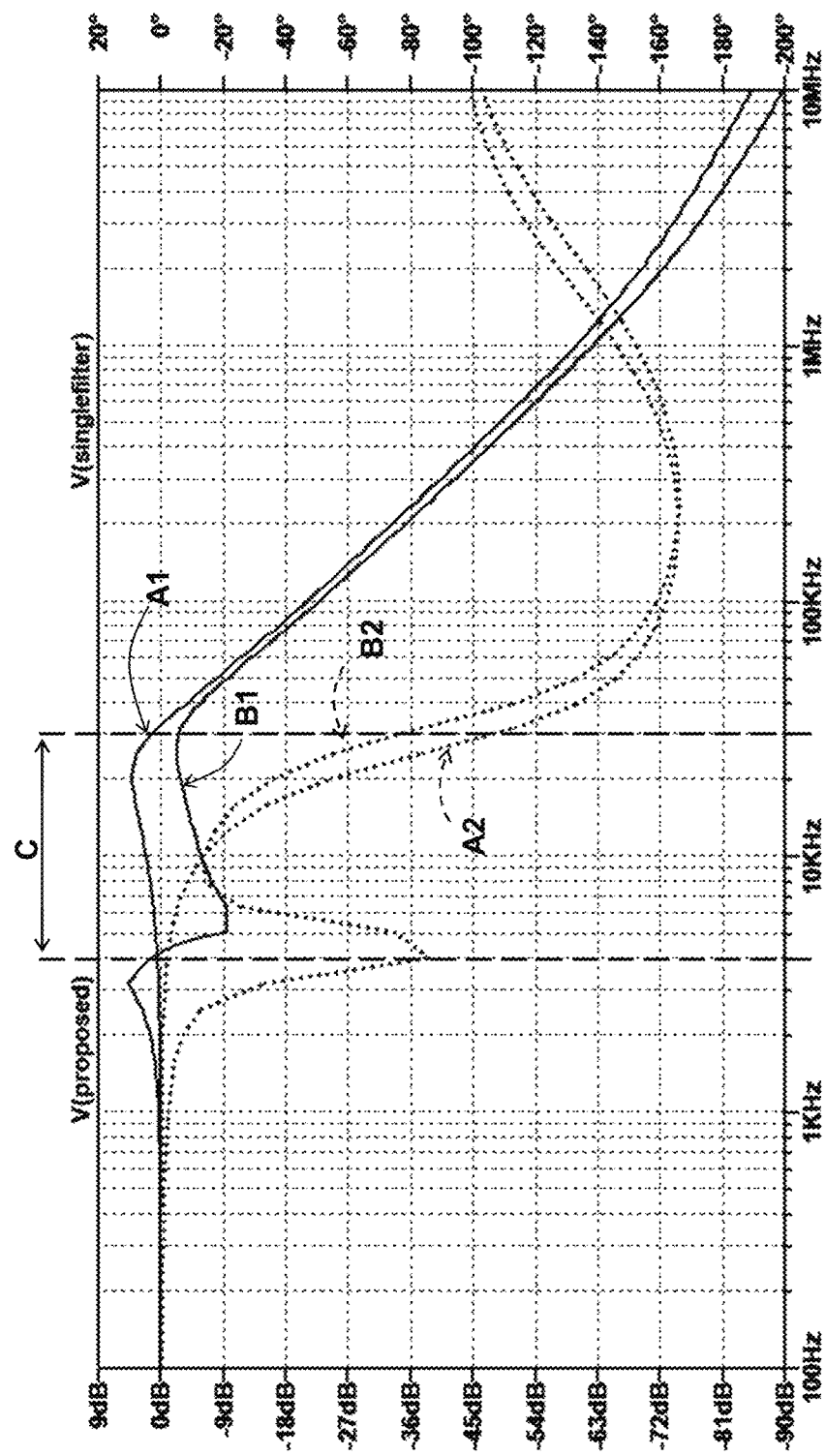
FIG. 8 show a Bode diagram wherein EMI-test results obtained with an embodiment of an improved brake control unit are compared with those obtained with a conventional brake control unit.

Conductive emission tests were performed with the exemplary embodiment. The results of the test are shown in FIG. 8. Therein, solid curve A1 and dashed curve A2 show the Bode diagram measured for the primary EMI-filter 517 only, i.e. with the secondary EMI-filter 527 disconnected from the power supply. The left vertical axis indicates the scale in dB with which the noise signal generated by noise source Vn is dampened when measured at the terminals of the power supply. The right vertical axis represents the phase change. The solid curve B1 and dashed curve B2 show the Bode diagram measured for the situation shown in FIG. 7, wherein the primary EMI-filter 517 is connected to the power supply to provide power to the primary invertor, which in turn is enabled to provide the drive signals the actuator. In addition the secondary EMI-filter 527 is connected to the power supply even though this is not required to enable the secondary invertor to provide drive signals to the actuator.

By way of example a fundamental frequency of the noise source Vn is in the frequency range C between 4 and 30 kHz. As becomes apparent, even while the total capacity of capacitive elements in the secondary EMI-filter 527 is less than a total capacity of capacitive elements in the primary EMI-filter 517, a significant noise reduction is achieved when the secondary EMI-filter 527 is maintained in electrical connection with the power supply during the normal operational mode. It has been recognized by the inventor that in particular a substantial noise reduction is achieved in the frequency range C where the noise source has its fundamental frequency. In practice the capacitance C12 at the output side of the primary branch EMI-filter 517 is relatively large as compared to the capacitance C11 at the input side thereof as it has to provide necessary RMS current to the motor and also has to tolerate ripple current coming from switching. Similarly the capacitance C22 at the output side of the secondary branch EMI-filter 527 is relatively large as compared to the capacitance C21 at its input side. Consequently, for low frequencies the impedance of the path formed by capacitance C22 and inductance L2 is much lower than the impedance formed by the path formed by the capacitances C21+C11. For low frequencies therefore, the role of the path formed by the capacitances C21+C11 can be ignored and it can be assumed that the transfer function is determined by the path through inductance L1 together with the path through capacitance C22 and inductance L2. Then for low frequencies the transfer function as specified in the Laplace domain simplifies to $$H_{low}=(s^2*L2*C22+1)/(s^2*(L1+L2)*C22+1).$$

This implies that 2 poles of the transfer function become dominant with a 40 dB decade fall in the low frequency range C in the gain plot B1 of the Bode diagram. Therefore the substantial noise reduction in the frequency range C is attributed to the serial arrangement of the second inductive branch L2 and the fourth capacitive branch C22 of the secondary branch EMI-filter 527. Two zeros of the transfer function become dominant with 40 dB decade rise in the gain plot B1 of the Bode diagram (B1) in a frequency range below the range C. The overshoot created therewith is at a frequency below the range C where a dampening of the noise source Vn is not required and is therewith not disadvantageous. A noise reduction in the low frequency range C is similarly achieved if the primary branch EMI-filter 517 comprises one or more additional PI units or comprises one or more other inductive elements, e.g. between its input I11 and its output O11. In that case the value of L1 in the above-mentioned transfer function $H_{low}$ is the sum of the inductances in the primary branch EMI-filter 517. Similarly, if the secondary branch EMI-filter 527 comprises one or more other inductive elements, e.g. in additional PI-units then the value of L2 is the sum of the inductances of the inductive elements. When the frequency increases, the impedance of the path formed by the capacitances C21 and C11 path becomes lower with respect to the path formed by capacitance C22 and inductance L2. Therefore, for relatively high frequencies the impedance of the C22 & L2 path may be ignored and it can be assumed that the transfer function is determined by the path formed by inductance L1 together with the capacitances C21+C11. Then for higher frequencies, the transfer function expressed in the Laplace domain (s domain) simplifies to $$H_{high}=1/(s^2*L1*(C21+C11)+1).$$

If only the primary EMI-filter 517 were used, the transfer function would roughly correspond to $$H'_{high}=1/(s^2*L1*C11+1).$$

Accordingly, the combined effect of the primary branch EMI-filter 517 and the secondary branch EMI-filter 527 is that the 2 poles of the transfer function create a 40 dB decade fall with a lower cutoff frequency and therefore a better noise suppression as compared to the case where only a primary EMI-filter 517 is applied. Therefore the substantial noise reduction for frequencies above the frequency range C is attributed to the serial arrangement of the L1 of the primary branch EMI-filter 517 and the parallel effect of the C21 capacitance of the secondary branch EMI-filter 527 together with the C11 capacitance of the primary branch EMI-filter 517. If the primary branch EMI-filter 517 comprises one or more additional PI units or comprises one or more other inductive elements, e.g. between its input I11 and its output O11 then the value of L1 in the above-mentioned transfer function $H_{high}$ is the sum of the inductances in the primary branch EMI-filter 517.

As shown above, the combined usage of the primary branch EMI-filter 517 and secondary branch EMI-filter 527 brings two benefits for EMC tests: A better suppression for lower frequencies, mainly C frequency range (Fundamental frequency, switching frequency, control frequency range), as a result of a combined effect of the C22 & L2 path together with L1; and a better suppression for higher frequencies, resulting from the combined capacitance of C21+C11 in the transfer function instead of only C11.

The exemplary brake control unit 50 as shown in FIG. 2 also comprises diagnostic utilities 515 and mode control utilities 530. The diagnostic utilities 515 are configured to provide a diagnostic state indication $S_{INT}$ of both control branches. In accordance with the diagnostic state indication $S_{INT}$ determined by the diagnostic utilities 515 the mode control utilities 530 select an operational mode of the brake control unit from a plurality of potential operational modes. In the example shown in FIG. 2, the primary control module 511 includes at least a first and a second mutually cooperating primary control component. In the embodiment shown the primary control module 511 comprises a primary power management controller 511A and a primary feedback controller 511B as first and second mutually cooperating primary control components. In the embodiment shown, the primary control module 511 comprises also a pre-driver 511C as a third primary control component that also cooperates with the primary power management controller 511A and the primary feedback controller 511B.

Likewise, the secondary control module 521 comprises a secondary power management controller 521A, a secondary feedback controller 521B and a secondary pre-driver 521C. In the embodiment shown the primary control branch 510 is provided according to ASIL-D requirements, and the secondary control branch 520 is of a lower ranked ASIL class, here ASIL-A.

The primary control branch 510 in the embodiment of FIG. 2 has an auto-diagnostic functionality. This is the case, in that the mutually cooperating primary power management controller 511A and the primary feedback controller 511B are have respective watchdog component 515a, 515b configured to perform a watchdog procedure, and to therewith diagnose each others integrity status. The watchdog components 515a, 515b perform a procedure wherein they periodically transmit to each other a question message Q with the request to perform a fixed series of arithmetic operations on a token value conveyed with the question message and to respond with a return message A that conveys the resulting token value within a predetermined time-interval. Either of the mutually cooperating control components is configured to signal a lack of integrity of the other one if the token value provided with the answer message deviates from an expected token value, or is not received within a specified time interval. In some embodiments either of the mutually cooperating control components is configured to signal a lack of integrity of the other one if it does not receive a question message within a specified time interval. The primary control module further comprises diagnostic utilities configured to diagnose an integrity status of the secondary control branch 520 by verifying a response signal $S_R$ of said branch in response to a test signal $S_T$. Therewith it is not necessary that the secondary control branch 520 has auto-diagnostic utilities. A very effective integrity verification is possible by providing the external brake signal $I_B$ as the test signal and to verify if the secondary control branch 520 responds to this signal in the same manner as the primary control branch 510. Due to the fact that the primary control branch 510 is of high integrity and has auto-diagnostic capabilities it is presumed that the control signals serves as a reliable reference for comparison with those of the secondary control branch 520.

In the normal operational mode the mode control utilities 530 enable the primary control branch 510 with an enable signal $En_{510}$ to generate from a supplied power $P_{dc1}$ a brake motor drive signal $D_{10}$ with its primary inverter 512 controlled by its primary control module 511 in response to an external brake control signal $I_B$. In that case the brake motor drive signal $D_{10}$ is provided as the brake motor drive signal $D_o$. In the normal operational mode the mode control utilities 530 also provide an enable signal $En_{563a}$ to close the power switch 563A, so that electric power is supplied from the power source selector 562 via the primary EMI-filter 517 to the primary inverter 512. Furthermore, an enable signal $En_{516}$ is provided to primary branch phase cutoff switch 516 to enable the primary inverter 512 to provide the primary motor drive signal $D_{10}$ to the brake actuator 12. In the normal operational mode M1 the secondary control branch 520 is not configured to provide a secondary motor drive signal $D_{20}$ to the brake actuator 12. However, the mode control utilities 530 provide an enable signal $En_{536b}$ to close the power switch 563B, so that also the secondary branch EMI-filter 527 is connected to the power source selector 562. In the embodiment shown, the power source selector 562 selects one of main battery package 561A and secondary battery package 561B as the one that is electrically connected to the primary branch input power supply switch 563A and the secondary branch input power supply switch 563B. In an other embodiment the power source selector 562 is replaced with an OR-type power supply, which connects the battery packages 561A, 562B in parallel if both are healthy and if it detects a defect in one of the battery packets it decouples that one. As noted, in the normal operational mode M1 the secondary control branch 520 is not configured to provide a secondary motor drive signal $D_{20}$ to the brake actuator 12. In some examples that is achieved in that the mode control utilities 530 provide a negative secondary branch enable signal $En_{520}$ so that the secondary control branch 520 is not operational. In other examples that is achieved in that the 530 provide a negative secondary branch phase cutoff switch enable signal $En_{526}$ so that the secondary control branch 520 is capable to generate a secondary motor drive signal $D_{20}$, but it is prevented by the secondary branch phase cutoff switch 526 that the $D_{20}$ can drive the brake actuator 12. In again other embodiments, the mode control utilities 530 in the normal operational mode both provide a negative secondary branch enable signal $En_{526}$ as well as a negative secondary branch phase cutoff switch enable signal $En_{526}$.

If the diagnostic state signal $S_{INT}$ indicates that the primary control branch 510 is not healthy, but that secondary control branch 520 is healthy, the second operational mode M2 is selected. In the second operational mode M2 the mode control utilities 530 enable the secondary control branch 520 with another enable signal $En_{520}$ to generate from the supplied power $P_{dc2}$ a brake motor drive signal $D_{20}$ with its secondary inverter 522 controlled by its secondary control module 521 in response to the external brake control signal $I_B$. In that case the brake motor drive signal $D_{20}$ is provided instead as the brake motor drive signal $D_o$. Either the brake motor drive signal $D_{10}$ in the normal operational mode, or the brake motor drive signal $D_{20}$ in the second operational mode is provided as the control signal $D_o$ to the brake motor 12. In some embodiments, the enable signal $En_{510}$ is used to activate/deactivate the primary control branch 510 in its entirety.

In some embodiments the mode control utilities 530 are configured to select a further operational mode M3 if the diagnostic state signal $S_{INT}$ indicates that the primary control branch 510 is healthy, but the secondary control branch 520 is not. In this further operational mode the mode control utilities 530 issue a negative enable signals $En_{563b}$, $En_{520}$, $En_{526}$ to fully deactivate the secondary control branch 520.

Figure 9:
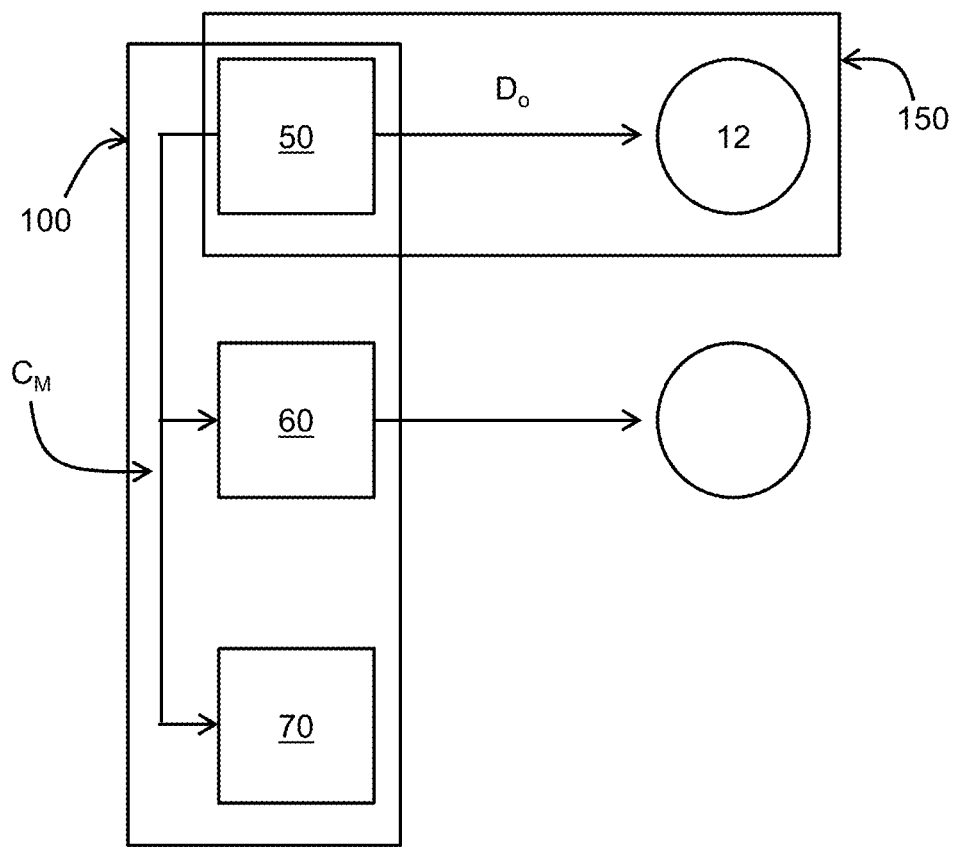
FIG. 9 illustrates an embodiment of a brake control system forming part of a vehicle control system.

FIG. 9 schematically shows a brake control system 150 comprising an electric brake having brake motor 12 and a brake control unit 50 as described for example with reference to FIG. 2, to drive the brake motor 12. In the example of FIG. 9, the brake control unit 50 is part of a vehicle control system 100 that controls various vehicle functions. The brake control unit 50 is configured to change an operational mode of at least one of said one or more additional control units 60, 70 in accordance with its own operational mode. In the example of FIG. 4 this is schematically indicated in that the brake control unit 50 provides a control signal Cm to the one or more additional control units 60, 70. In practice various elements of the vehicle control system are configured to communicate to each other through a communication facility, e.g. a CAN bus, or a Bluetooth connection rather than dedicated control wires. In some embodiments, the additional control units comprise a speed control unit 60 for controlling a speed of the vehicle. In examples of these embodiments the brake control unit 50, when determining that it is not in its normal operational mode, e.g. in mode M2 or mode M3 controls the speed control unit 60 to impose a maximum on the speed with which the speed control unit 60 is capable to drive the vehicle. Hence in those embodiments the modes M2 and M3 are degraded operational modes. In the exemplary case of FIG. 3 the brake control unit 50 has a fourth operational mode M4, which is assumed if the diagnostic state signal $S_{INT}$ indicates that both the primary control branch 510 and the secondary control branch 520 are not healthy. In some examples the mode control utilities 530 discontinue vehicle operation in the fourth operational mode M4. In some examples the mode control utilities 530 additionally or alternatively select the fourth operational mode M4 upon determining that a predetermined time interval has lapsed and/or a predetermined distance was driven subsequent to assuming the second operational mode M2 or the third operational mode M3. Hence, also in that case the mode control utilities 530 cause the vehicle control system 100 to discontinue vehicle operation. The restriction of further use to a predetermined time interval and/or to a predetermined distance provides the driver an opportunity to drive the vehicle to a garage, but avoids that the driver continues to use the vehicle as if the brake system were fully reliable.

In some embodiments of the brake control unit 50, the secondary control branch 520 is fully operational in the normal operational mode, apart from the fact that it is not enabled to drive the brake motor. In that case the diagnostic utilities 515 of the primary control module 511 are capable to continuously monitor the integrity of the secondary control branch 520. In some embodiments, the diagnostic utilities compare a response signal $S_T$ from the secondary control branch 520 that is indicative for a signal CI2 provided by the secondary control module 521 to the secondary inverter 522 with a reference signal that is indicative for a control signal provided by the primary control module 511 to the primary inverter 512. According to one option, the signal to be compared are the inverter control signals proper. According to another option the signals to be compared are duplicated or modified versions thereof. In some embodiments, in the normal operational mode, the secondary control branch 520 is operated at a lower frequency, or is periodically activated for a relatively short period in which it operates at a normal frequency.

In the embodiment shown in FIG. 2, the mode control utilities of the brake control unit 50 are configured to control a primary phase cut-off switch 516 and a secondary phase cut-off switch 526 with control signals $En_{516}$ and $En_{526}$ respectively. During normal operational mode, the primary control branch 510 and the secondary control branch 520 are both enabled to generate their brake motor drive signal $D_{10}$, $D_{20}$ respectively in some embodiments. The mode control utilities 530 however enable the primary control branch 510 to actually deliver its brake motor drive signal $D_{10}$ via the primary phase cut-off switch 516, and blocks the brake motor drive signal $D_{20}$ with the secondary phase cut-off switch 526. In this embodiment the response signal $S_R$ of the secondary control branch 520 to be verified by the diagnostic utilities 515 is a signal indicative for the brake motor drive signal $D_{20}$ provided by the secondary control branch 520. The reference response signal with which this response signal SR is compared is a signal indicative for the brake motor drive signal $D_{10}$ provided by the primary control branch 510. In some embodiments, the signals are indicative for the brake motor drive signals $D_{10}$, $D_{20}$, for example, in that they are proportional thereto. In this way, the diagnostic utility 515c is configured to also verify the operation of the back-up inverter 522. In other embodiments the controlled phase cutoff switches 516 and 526 is absent, and instead, the mode control utilities 530 are configured to selectively enable one of the primary inverter 512 and the secondary inverter 522 with control signals $En_{563a}$, $En_{563b}$ to the input power supply switches 563A, 563B. In still further embodiments the mode control utilities 530 are configured to selectively enable one of the primary inverter 512 and the secondary inverter 522 by a respective control signal component in the control signals $En_{510}$, $En_{520}$.

In the embodiment shown in FIG. 2, the power supply 560 has redundant elements to minimize the risk of a power failure. In this exemplary embodiment the power supply 560 comprises a main battery package 561A, a secondary battery package 561B and a power source selector 562. The power source selector 562 is configured to select the main battery package 561A by default and to select the secondary battery package 561B if it detects a failure of the main battery package 561A. Also in this case various mutually non-exclusive options are available. According to one option, upon detection of a failure of the main battery package 561A the mode control utilities 530 assume a degraded operational mode, urging the driver to have the power supply 560 repaired and/or restricting functionalities of the vehicle, e.g. restricting a maximum speed and/or a disabling further use of the vehicle after a predetermined time interval has passed or a predetermined number of kilometers has been driven with the vehicle since the transition to the degraded operational mode. As the secondary battery package 561B is only intended for use during a short term it requires only a modest capacity as compared with that of the main battery package 561A. Nevertheless it helps to prevent serious consequences in the undesired event that the main battery package 561A fails.

In the example of FIG. 3 reference M0 indicates the non-operational state wherein the brake control unit 50 is powered off. In the example shown, the plurality of potential operational modes further comprises a power-up mode M01. Upon power up of the brake control unit 50 the mode control utilities 530 first assume this transitional mode M01 wherein the diagnostic utilities 515 provide a control signal to the backup control branch 520 to cause the backup control branch 520 to generate a brake motor drive signal $D_{20}$. Therewith the mode control utilities 530 temporarily enable the backup control branch 520 to drive the brake motor 12 with the brake motor drive signal $D_{20}$. The diagnostic utilities 515 therewith diagnose an operation of the backup control branch 520 by verifying an operation of the brake motor 12 in response to the brake motor drive signal $D_{20}$. In some embodiments, the diagnostic utilities sense a motor angle signal to determine whether or not the brake motor rotates. In some embodiments, the diagnostic utilities 515 also perform this procedure for the primary control branch 510 during the power-up mode M01. If the diagnostic procedure in operational mode points out that both the primary control branch 510 and the backup control branch 520 have the required integrity status, the mode control utilities 530 assume the normal operational mode M1. If it is determined in the power-up mode M01 (or during operation in the normal operational mode M1) that the primary control branch 510 suffers from a lack of integrity, the mode control utilities 530 assume the operational mode M2. If it is determined during the power-up mode M01 (or during operation in the normal operational mode M1), that the secondary control branch 520 suffers from a lack of integrity the mode control utilities 530 assume operational mode M3. If it is determined during the power-up mode M01 (or during operation in the normal operational mode M1), that bot the primary control branch 510 and the secondary control branch 520 suffers from a lack of integrity the mode control utilities 530 assume operational mode M4.

In the embodiment as shown in FIG. 2, the brake control unit 50 comprises diagnostic utilities 515 as well as mode control utilities 530. In alternative embodiments diagnostic utilities and/or mode control utilities are provided external to the brake control unit 50. In examples thereof, such external diagnostic utilities and/or mode control utilities are comprised in a master controller in a vehicle control system 100 as shown in FIG. 9 for example. In some examples thereof external diagnostic utilities and/or mode control utilities are provided in addition to the diagnostic utilities 515 and/or mode control utilities 530.

In the example of the FIG. 2, the secondary control branch 520 is of a lower ranked ASIL class, such as ASIL-A, ASIL-B or ASIL-C than that of the primary control branch 510, which is provided according to ASIL-D requirements. In practice this is sufficient, in that the integrity of the secondary control branch 520 is monitored. In the absence of integrity deficiencies of secondary control branch 520 it is available to temporarily serve as a backup for the primary control branch 510. If a deficiency of integrity of the secondary control branch 520 is detected, the mode control unit will select the further degraded operational mode M3 wherein the driver is urged to have the brake system 50 repaired. Nevertheless, in some embodiments also the secondary control branch 520 is provided according to ASIL-D requirements.

Figure 10:
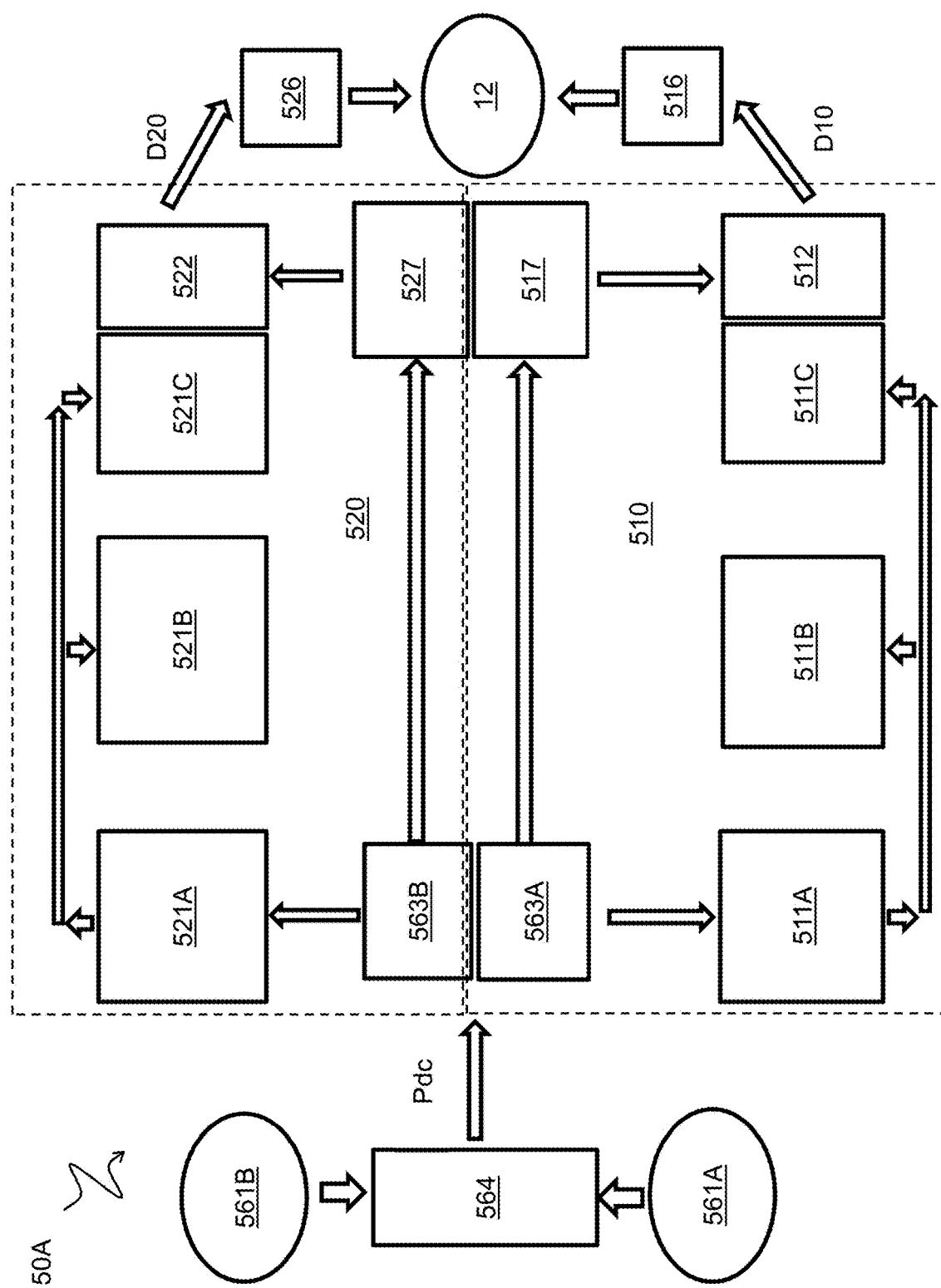
FIG. 10 illustrates another embodiment of an improved brake control unit.

An exemplary embodiment thereof is the brake system 50A shown in FIG. 10. In this example a supply voltage Pdc is supplied by a power source combiner 564 which is coupled to both a main battery package 561A and a secondary battery package 561B. The power source combiner 564 is configured to supply the supply voltage Pdc from the battery packages 561A, 561B switched in parallel if both are diagnosed as healthy, and to disconnect a battery package if it is diagnosed as not healthy.

In the exemplary embodiment shown in FIG. 10 the operational mode is controlled by an external mode controller which is responsive to an external diagnostic state signal. In some examples the external mode controller and diagnostic facilities are provided in a master controller vehicle control system 100.

In a normal operational mode the primary control branch 510 and the secondary control branch 520 each provide a respective drive signal $D_{10}$ and $D_{20}$ to the brake actuator 12. In an example the brake actuator 12 is a 6-phase actuator and the drive signals $D_{10}$ and $D_{20}$ each comprises 3 drive signal components that in combination is a 6-phase drive signal for the brake actuator 12. Accordingly, during the first, normal operational mode, both the primary EMI-filter 517 and the secondary EMI-filter 527 are coupled with their input to the power source 564. The parallel arrangement of these EMI-filters 517, 527, therewith provide for an improved reduction of noise as compared to an arrangement wherein each EMI-filter is to reduce noise for a respective power source. If lack of integrity is detected for the primary control branch 510 a secondary operational mode M2 is assumed wherein the primary branch phase cutoff switch 516 prevents that the primary control branch 510 provides a drive signal to the brake actuator 12. In the secondary operational mode M2 the secondary control branch 520 of the brake system 50A is still operational and capable to drive the brake actuator 12 so that the driver has an opportunity to safely drive the vehicle to a garage for maintenance. Similarly, if a lack of integrity is detected for the secondary control branch 520 a third operational mode M3 is assumed wherein the secondary branch phase cutoff switch 526 prevents that the secondary control branch 520 provides a drive signal to the brake actuator 12. In the third operational mode M3 the primary control branch 510 of the brake system 50A is still operational and capable to drive the brake actuator 12 so that the driver has an opportunity to safely drive the vehicle to a garage for maintenance. Also in the secondary operational mode M2 and the third operational mode M3 both the primary EMI-filter 517 and the secondary EMI-filter 527 are coupled with their input to the power source 564. Also in the operational modes M2, M3, the parallel arrangement of the EMI-filters 517, 527 therewith provides for an improved reduction of noise. However, in case the diagnostic state indicator indicates that a control branch tends to jeopardize other system components, e.g. upon detection of a shortcut in a control branch the mode control unit (not shown) is configured to fully or partially disconnect suspicious components in that branch from the power source. In the example shown, the mode control unit is configured to control primary branch input power supply switch 563A to disconnect the primary branch EMI-filter 517 and therewith the primary inverter 512 and/or one or more of the controllers 511A, 511B, 511C from the power source 564. In the example shown, the mode control unit is also configured to control secondary branch input power supply switch 563B to disconnect the secondary branch EMI-filter 527 and therewith the secondary inverter 522 and/or one or more of the controllers 521A. 521B, 521C from the power source 564.

FIG. 11 schematically shows a vehicle 10 with a pair of front wheels 11FL, 11FR and a pair of rear wheels 11RL, 11RR. Each of the wheels 11FL, 11FR, 11RL, 11RR is provided with a proper vehicle brake motor 12FL, 12FR, 12RL, 12RR that is controlled by a proper brake control unit 50FL, 50FR, 50RL, 50RR. Each pair of a brake control unit and the vehicle control motor controlled therewith forms an electric brake system 150FL, 150FR, 150RL, 150RR. The electric brake systems 150FL, 150FR, 150RL, 150RR are each coupled via a respective vehicle interface unit 7FL, 7FR, 7RL and 7RR to a master controller 110. In exemplary embodiments, the vehicle interface units (also denoted as gateway) provide for a conversion of messages from a first message protocol to a second message protocol and reversely. The first message protocol is for example an Ethernet protocol for the messages exchanged with the master controller 110. The second message protocol is for example a CAN-protocol for communication with the electric brake systems 150FL, 150FR, 150RL, 150RR. The electric brake systems 150FL, 150FR, 150RL, 150RR and the master controller 110 are part of vehicle control system 100. In the embodiment shown, the vehicle control system 100 further includes a vehicle movement control system unit 120, that is capable to provide control signals to the master controller 110 so as to autonomously drive the vehicle 10. In other embodiments control signals for the master controller 110 are provided by driver control elements such as a steering wheel, a speed control pedal, a brake control pedal and the like. In still other embodiments control signals for the master controller 110 are provided partly by driver control elements, e.g. control signals for steering control and partly by a vehicle movement control system unit 120, e.g. a speed control signal generated by a cruise control module of the vehicle movement system control unit 120.

REFERENCE ENTITY $D_{10}$ primary motor drive signal
$D_{20}$ secondary motor drive signal
$En_{510}$ primary branch enable signal
$En_{516}$ primary branch phase cutoff switch enable signal
$En_{520}$ secondary branch enable signal
$En_{526}$ secondary branch phase cutoff switch enable signal
$En_{563a}$ primary branch input power supply switch enable signal
$En_{563b}$ secondary branch input power supply switch enable signal
M0 power-off mode
M01 power-up mode
M1 normal operational mode
M2 secondary operational mode
M3 further degraded operational mode
M4 controlled power-off mode
$P_{dc1}$ primary control branch supply power
$P_{dc2}$ primary control branch supply power
$S_{INT}$ diagnostic state signal
7FL, 7FR, 7RL, 7RR gateway
10 vehicle
11FL, 11FR, 11RL, 11RR wheel
12, 12FL, 12FR, 12RL, 12RR brake actuator
50, 50FL, 50FR, 50RL, 50RR brake control unit
50A brake system
60 speed control unit
60, 70 additional control units
100 vehicle control system
110 master controller
120 vehicle movement system control unit
150, 150FL, 150FR, 150RL, 150RR electric brake system
510 primary control branch
511 primary control module
511A primary power management controller
511B primary feedback controller
511C primary pre-driver
512 primary inverter
515 diagnostic utilities
515a, 515b, 515c diagnostic units
516 primary branch phase cutoff switch
517 primary branch EMI-filter
520 secondary control branch
521 secondary control module
521A secondary power management controller
521B secondary feedback controller
521C secondary pre-driver
522 secondary inverter
526 secondary branch phase cutoff switch
527 secondary branch EMI-filter
530 mode control utilities
550 signal selector
561A main battery package
561B secondary battery package
562 power source selector
563A primary branch input power supply switch
563B secondary branch input power supply switch
564 power source combiner

The invention claimed is:

1. A brake control unit comprising a primary control branch and a secondary control branch, the brake control unit being configured (i) to drive a brake actuator with a drive signal in response to an external brake control signal and (ii) to assume an operational mode selected from at least a first, normal operational mode and at least a second operational mode, dependent on a diagnostic state indication;
   the primary control branch comprising a primary inverter that is configured to provide the drive signal to the brake actuator in at least the first, normal operational mode, a primary control module to control operation of the primary inverter, and a primary EMI-filter to mitigate noise originating from the primary inverter and the brake actuator, the primary EMI-filter having inputs for receiving electric power from a power source and outputs for providing electric power to the primary inverter;
   the secondary control branch comprising a secondary inverter configured to provide the drive signal to the brake actuator in at least the second operational mode, a secondary control module to control operation of the secondary inverter, and a secondary EMI-filter to mitigate noise originating from the second inverter and the brake actuator, the secondary EMI-filter having inputs for receiving electric power from the power source and outputs for providing electric power to the secondary inverter;
   wherein during the first, normal operational mode, both the primary EMI-filter and the secondary EMI-filter are coupled with their inputs to the power source.

2. The brake control unit according to claim 1, wherein total capacity of capacitive elements in the secondary EMI-filter is less than total capacity of capacitive elements in the primary EMI-filter.

3. The brake control unit according to claim 1, wherein the secondary invertor is enabled to generate secondary drive signals but is prevented from providing the secondary drive signals to the brake actuator when the brake control unit is operating in the first, normal operational mode.

4. The brake control unit according to claim 1, wherein at least one output of the secondary EMI-filter is decoupled from the secondary invertor when the brake control unit is operating in the first, normal operational mode.

5. The brake control unit according to claim 1, capable of operating in an operational mode, wherein at least an input of the secondary EMI-filter is decoupled from the power source.

6. An electric brake system comprising:
   a brake actuator;
   a brake control unit comprising a primary control branch and a secondary control branch, the brake control unit being configured (i) to drive the brake actuator with a drive signal in response to an external brake control signal and (ii) to assume an operational mode selected from at least a first, normal operational mode and at least a second operational mode, dependent on a diagnostic state indication;
   the primary control branch comprising a primary inverter that is configured to provide the drive signal to the brake actuator in at least the first, normal operational mode, a primary control module to control operation of the primary inverter, and a primary EMI-filter to mitigate noise originating from the primary inverter and the brake actuator, the primary EMI-filter having inputs for receiving electric power from a power source and outputs for providing electric power to the primary inverter;
   the secondary control branch comprising a secondary inverter configured to provide the drive signal to the brake actuator in at least the second operational mode, a secondary control module to control operation of the secondary inverter, and a secondary EMI-filter to mitigate noise originating from the second inverter and the brake actuator, the secondary EMI-filter having inputs for receiving electric power from the power source and outputs for providing electric power to the secondary inverter;
   wherein during the first, normal operational mode, both the primary EMI-filter and the secondary EMI-filter are coupled with their inputs to the power source.

7. A vehicle control system comprising:
   a vehicle brake actuator;
   a brake control unit comprising a primary control branch and a secondary control branch, the brake control unit being configured (i) to drive the vehicle brake actuator with a drive signal in response to an external brake control signal and (ii) to assume an operational mode selected from at least a first, normal operational mode and at least a second operational mode, dependent on a diagnostic state indication;
   the primary control branch comprising a primary inverter that is configured to provide the drive signal to the brake actuator in at least the first, normal operational mode, a primary control module to control operation of the primary inverter, and a primary EMI-filter to mitigate noise originating from the primary inverter and the brake actuator, the primary EMI-filter having inputs for receiving electric power from a power source and outputs for providing electric power to the primary inverter;
   the secondary control branch comprising a secondary inverter configured to provide the drive signal to the brake actuator in at least the second operational mode, a secondary control module to control operation of the secondary inverter, and a secondary EMI-filter to mitigate noise originating from the second inverter and the brake actuator, the secondary EMI-filter having inputs for receiving electric power from the power source and outputs for providing electric power to the secondary inverter;
   wherein during the first, normal operational mode, both the primary EMI-filter and the secondary EMI-filter are coupled with their inputs to the power source;
   one or more further control units to control additional vehicle functions, wherein the brake control unit is configured to change an operational mode of at least one of said one or more additional control units in accordance with its own operational mode.

8. The vehicle control system according to claim 7, wherein said one of the one or more additional control units comprises a speed control unit for controlling a speed of the vehicle, wherein the brake control unit in an operational mode other than the first, normal operational mode imposes a maximum on the speed with which the speed control unit is enabled to drive the vehicle.

9. The vehicle control system according to claim 7, wherein the brake control unit causes the vehicle control system to discontinue vehicle operation upon determining that a predetermined time interval has lapsed and/or a predetermined distance was driven after the vehicle's operational mode was no longer the first, normal operational mode.

10. A vehicle comprising:
    a vehicle brake system according to claim 6 and
    a plurality of wheels;
    wherein at least one wheel of the plurality of wheels is provided with a vehicle brake actuator to controllably apply braking to said at least one wheel.

11. The brake control unit according to claim 2, wherein the secondary invertor is enabled to generate secondary drive signals but is prevented from providing the secondary drive signals to the brake actuator when the brake control unit is operating in the first, normal operational mode.

12. The brake control unit according to claim 2, wherein at least one output of the secondary EMI-filter is decoupled from the secondary invertor when the brake control unit is operating in the first, normal operational mode.

13. The brake control unit according to claim 2, capable of operating in an operational mode, wherein at least an input of the secondary EMI-filter is decoupled from the power source.

14. The vehicle control system according to claim 7, wherein total capacity of capacitive elements in the secondary EMI-filter is less than total capacity of capacitive elements in the primary EMI-filter.

15. The vehicle control system according to claim 7, wherein the secondary invertor is enabled to generate secondary drive signals but is prevented from providing the secondary drive signals to the brake actuator when the brake control unit is operating in the first, normal operational mode.

16. The vehicle control system according to claim 7, wherein at least one output of the secondary EMI-filter is decoupled from the secondary invertor when the brake control unit is operating in the first, normal operational mode.

17. The vehicle control system according to claim 7, capable of operating in an operational mode, wherein at least an input of the secondary EMI-filter is decoupled from the power source.

18. The vehicle according to claim 10, further comprising one or more further control units to control additional vehicle functions, wherein the brake control unit is configured to change an operational mode of at least one of said one or more additional control units in accordance with its own operational mode.

19. The vehicle according to claim 18, wherein said one of the one or more additional control units comprises a speed control unit for controlling a speed of the vehicle, wherein the brake control unit in an operational mode other than the first, normal operational mode imposes a maximum on the speed with which the speed control unit is enabled to drive the vehicle.

20. The vehicle according to claim 19, wherein the brake control unit causes the vehicle control system to discontinue vehicle operation upon determining that a predetermined time interval has lapsed and/or a predetermined distance was driven after the vehicle's operational mode was no longer the first, normal operational mode.

\* \* \* \* \*